(12) United States Patent
Toma et al.

(10) Patent No.: US 6,465,048 B1
(45) Date of Patent: Oct. 15, 2002

(54) METHOD OF IMPROVING SHOTCRETE TECHNOLOGY

(76) Inventors: Ioan Toma, 6525, Wilderton Avenue, Apt. 512, Montréal (CA), H3S 2L4; Ileana Toma, 6525, Wilderton Avenue, Apt. 512, Montréal (CA), H3S 2L4; Pierre Rolland, 3130, Linton, Apt. 8, Montréal (CA), H3S 1S6

(*) Notice: Subject to any disclaimer, the term of this patent is extended or adjusted under 35 U.S.C. 154(b) by 0 days.

(21) Appl. No.: 09/708,099

(22) Filed: Aug. 11, 2000

Related U.S. Application Data

(63) Continuation-in-part of application No. 09/227,920, filed as application No. PCT/CA97/00482 on Jul. 7, 1997, now abandoned.
(60) Provisional application No. 60/021,374, filed on Jul. 8, 1996.

(51) Int. Cl.[7] .................................................. B05D 1/02
(52) U.S. Cl. ........................................................ 427/427
(58) Field of Search .................................. 427/421, 427

(56) References Cited

U.S. PATENT DOCUMENTS

| | | | |
|---|---|---|---|
| 2,279,262 A | | 4/1942 | Edwards |
| 4,293,463 A | * | 10/1981 | Vroom .................... 260/42.24 |
| 4,762,811 A | * | 8/1988 | Vayda et al. ................. 501/124 |
| 4,773,934 A | * | 9/1988 | Colin .......................... 106/97 |
| 4,931,098 A | | 6/1990 | Danielssen et al. |
| 5,494,516 A | * | 2/1996 | Drs et al. .................... 106/819 |
| 5,512,096 A | * | 4/1996 | Krause ....................... 106/718 |
| 5,650,004 A | * | 7/1997 | Yon ........................... 106/719 |

FOREIGN PATENT DOCUMENTS

| | | |
|---|---|---|
| EP | 0 439 372 | 7/1991 |
| EP | 0 681 999 | 11/1995 |

OTHER PUBLICATIONS

Lewis, Richard J. Condensed Chemical Dictionary, 12 ed., Van Nostrand Reinhold, 1993; p. 116.*

Braniste et al. Bul, Inst. Politech. Iasi, Sect. 5 (1977), 23 (1–2), 77–82.

ZA 9507733 (Summary) Jun. 26, 1996.

* cited by examiner

*Primary Examiner*—Shrive P. Beck
*Assistant Examiner*—Eric B Fuller

(57) ABSTRACT

An improvement to the method for the dry or wet production of a layer by spraying a sprayable mixture containing cement and particularly concrete, is disclosed. According to the improvement, barium sulphate and specifically barite is incorporated into the cement-containing mixture.

1 Claim, No Drawings

METHOD OF IMPROVING SHOTCRETE TECHNOLOGY

RELATED APPLICATION

This invention is a Continuation-in-part of application Ser. No. 09/227,920 filed Jan. 8, 1999 now abandoned which claims benefit of provisional application No. 60/021,374 filed Jul. 8, 1996 which is the national stage application of PCT/CA97/00482 filed Jul. 7, 1997.

BACKGROUND OF INVENTION (a) Field of the Invention

This invention refers to an improved method in the domain of the shotcrete technology, using a microstructure, the shotcrete being composed by a perfect chemically stable mineral mixed with cement, aggregates and water, placed in position by projection preferably pneumatic.

Particularly, this invention is about adding barium sulphate, specifically barite, in the shotcrete technology, aiming to improve the feeding, the mixing, the transportation and the projection, as well as the resulting improved products, namely grouts, coatings, mortars concretes, embankments, etc.

(b) Description of the Prior Art

It is well known that placing mortars and concretes by projection began in the USA by the beginning of this century. The projection was done using a special machine called "Cement Gun". The shotcrete technology, as far as we know, was applied first in Romania, in 1905 for a concrete dam, protected by a 8 cm shotcrete casing.

Sixty years later, in 1965, the dam was verified and it was found out that on the upstream side it was well preserved but on the downstream it presented distortions and fissures. This work proved the durability of shotcrete, the distortions being due to normal aging after 60 years especially considering the equipment used by that time.

The shotcrete technology has been drastically improved during the last 90 years, mostly after the second world war, concerning the equipment, the components, the environmental problems, the hygiene and the work security, the professional illnesses and the workers training; but still progress has to be made.

Shotcrete is though a concrete placed in position by projection usually a pneumatic one, at high speed, with or without previous pumping. Compared to standard concrete, cast and vibrated, this concept of projection at high speed offers specific advantages and disadvantages, and consequently, a specificity of uses. Thus the speed and the power of projection make it easier to get a more compact product, denser, more impervious and less porous, with a better cohesiveness and better adherence to the surfaces to be placed on, indifferent to their regular or not regular shape, texture or hardness. Among others, this pneumatic projection concept assures the mixed components transportation from the mixer to the surfaces to be covered by hoses and that up to 600 meters distance with the dry process. It allows operating in very exiguous spaces, eliminates forms, allows vertical or horizontal (ceiling or floor) projections. It serves also in getting a better anticorrosive protection, especially on metal reinforcements, and as fireproof protection. In spite of all these many important advantages, it faces a lot of difficulties and limitations which were the subject for science and industry to solve since many years. Depending on the kind of mixing process, dry or wet, the main disadvantages are: abrasion and blocking of the mixing equipment and of the hoses; irregular quality of the mixing operation and segregation during transportation and projection; long, difficult and often imperfect cleaning of the equipment after use; very important need of controlling and adjusting the degree of humidity inside and outside the equipment during mixing and transportation to avoid the early and unwanted setting of cement; need to use setting retarders or superplasticizers in the wet process; generation of dust especially in the dry process during feeding, transportation and projection, negatively affecting the pulmonary health of the "nozzleman", the visibility and the adherence to the receiving surfaces; rebounds and ricochets during projection, causing waste of materials, risks of injuries for the "nozzleman", sand pockets and voids in the projected product; a jerkily projection, with blocking ups and lashings, causing risks of injuries for the "nozzleman" and also variation in the quality, homogeneity and uniformity of the final product; difficulty for the "nozzleman" to maintain a perfect control over the water-cement ratio during projection in the dry process which is an essential factor for the quality of the product; expertise and adequate experience of the "nozzleman" as the main factor; generation of static electricity mostly in the dry process.

Many innovations have been suggested in the past years to correct those disadvantages, or to improve the performance of the shotcrete technology, namely by using set accelerators or retarders, air entertaining agents, latex, water reducers or superplasticizers. Nevertheless, the more components there are, the more difficult it is to control the long term durability due to the problems of compatibility of admixtures-additives, cements, or aggregates used. More, one must keep in mind that shotcrete is often used in unknown environments, or in environments that will become unknown or uncontrolled with time.

It is well known from previous works (U.S. Pat. No. 4,931,098), to improve shotcrete projection by using silica fume with less than 90% $SiO_2$ in the starting mixture. It is usual to use 5–30% silica fume weight to the weight of bubbling solution and this is 8–10% to the weight of cement. Silica fume is used because one can get a more impervious product in the short run and a satisfactory quantity of rebounds. Also one may notice that silica fume is on a long term a source of professional illnesses and its use neither eliminated nor minimized the alkaline reactions or the appearance of fissures or micro fissures of expansion or contraction in the long run. More, the "nozzlemen" as well as the environmentalists are more reserved in using and working with this product in shotcrete technology.

One of the applicants, engineer Toma already applied the shotcrete technology in 1943 in Romania, in a coal mine. The work place was situated in a zone with methane gas ($CH_4$) emanation and the work consisted in stopping the gas migration and silting the place. More, a patent concerning a shotcrete machine sold in Romania and Morocco as "Torcreting machine type Toma" was delivered to him as author (patent number 51,166/Jun. 27 1966). He also got another Romanian patent as a co-author (patent number 50,548/Mar. 14 1966) for a device to shoot a mix of concrete. This device used a pneumatic engine and was used to protect the feeble strength rocks 15 minutes after rocks dislocation. Another patent (51,338/Oct. 20 1967) was delivered to him as author of a method of consolidating the underground excavation of feeble strength rocks with shotcrete. The method consisted of making helical canals in the rocky walls on different angles.

On the other hand it is known that the use of barite in the standard concrete mixtures was studied for a long time. The goal was to get a heavy concrete, impervious to X-rays and Gamma-rays. But these studies were done on concrete made by pouring and vibrating ways and they did not come to eliminate the gravimetric segregation (resulting in less compactness and imperviousness).

Therefore the inventors think that their efforts must, as much as possible, look for "sustainable development" as expressed in the "Rio Convention".

The invention has, as a goal, the minimal use of chemically constituted components which might interact chemically and/or act chemically with the environment, in short, medium, or long term.

SUMMARY OF INVENTION

The disadvantages of the prior art are highly eliminated by providing an invention which is directed to a method which comprises preparing a water-hydratable-cement base projection mix, and pneumatically projecting the mix at high speed and ambient temperature directly against a surface under conditions such that the mix forms a layer which adheres to the surface and which holds well in place without having to use forms or closed or non closed molds, wherein the mix necessarily comprises barite, which is compatible with all organic and inorganic components, the mix requiring no addition of calcium sulphate in free state, nor any addition of silica fume in free state.

Preferably, the projection mixture is a grouting mixture, or a coating mixture, or a mortar mixture, or a concrete mixture, or an embankment mixture.

The mixture may include up to about 100% by weight of barite with respect to the weight of cement in the mixture. Preferably, the mixture will include between 2 and 50% by weight, for example between 2 and 10% by weight of barite with respect to the weight of cement in the mixture.

It is possible to use a barite which has a granulometry between 0.01 micron and 75 mm, a barium sulphate content between 40 and 99% and up to about 30% $SiO_2$ so as to provide a product with high chemical resistance and/or a product with a high compression strength.

According to a preferred realization, the surface to cover might contain rocks and/or degraded concrete and/or wood. The application (sandwich like) would ten be done by shooting the surface with a mix to achieve a layer which makes the surface liquid and gas impervious and/or fireproof, and then shooting successively or alternatively one or more mixes of coating, or mortar, or concrete or embankment on the impervious and/or fireproof layer to form one or more protective and bearing structures, and finally one last grouting or coating mixture is projected to constitute a protection layer thus eliminating or decreasing formation of efflorescence, and degradation of the surface trough external aggressive chemical agents, the succession of layers possibly being in the form of sandwich. According to another realization, the surface is made of beds of metal bearing and non metal bearing minerals, coal, salt, ice deposits, construction materials of weak strength or degraded concrete, and previously to the projection, channels are formed having a cross-section of inverted pyramidal shape or a swallow tail shape on the surface so as to anchor the cement base mixture to be projected and to prevent circulation of water, injurious, aggressive and explosive gases under pressure under the surface. The depth of these channels would be at least 10 cm and the width at least 15 cm. It is preferable to create helical channels with a 50 cm step which of course may vary depending on the quality of the rock or concrete surface. They may be reinforced with metallic elements (strength bars) or by anchoring. Their profile would be square or trapezoid.

Preferably, the channels have continuous or discontinuous helical shapes which may vary depending on the quality of the rock or concrete surface.

DESCRIPTION OF PREFERRED EMBODIMENTS

It was discovered that barium sulphate ($BaSO_4$), usually found as a mineral called barite, is very useful when incorporated as an essential element in the production of shotcrete. It was also proven that barite improves the shotcrete technology and vice-versa, that the shotcrete technology improves some properties of barite. This beneficial relation does not exist in the conventional concrete technology.

Here are the barite properties:
pH: 6.4 to 7.2;
low hardness: 3 to 3.5 on the Mohs scale;
density: 4.3 to 4.6
chemical inertness;
extreme insolubility of 0.000285 g/100 g H20 at 30 C;
complete absence of effervescence in hydrochloric acid;
opacity to X-rays and to Gamma-rays;
low abrasiveness degree;
properties as lubricant and filler;
pale tint and very low reflection power (just above that of quartz);
fineness to 0.01 micron;
big compression reversibility (incompressibility and inagglomerability);
amorphous feature;
antimagnetic property;
relative nontoxicity for humans and animals;
negative impact on benthos colonies;
melting temperature of 1250° C.;
low expansion coefficient and thermic stability;
good thermic accumulation capacity;
good thermic insulation capacity;
low rate of oil absorption;
facility of wetting by oil;

Those barite properties, when applied to shotcrete technology act in a "multiplied/exponential" way, instead of a cumulative way. They interact with one another; one can talk of a synergistic combination.

Thus the lubricating and the filling characteristics of barite allow among others: to lessen the abrasion of the mixer and of the hoses; to ensure easier pneumatic transportation and pumping transportation, a consequence of less resistance by the inner surface of the hoses and less friction between the particles of the constituents; a better fluidity of the particles and less segregation; a shooting speed with less energy consumed; getting a more homogenous mix of cement, water and aggregates, and subsequently a softer and more uniform rhythm of projection with less jerks; to lessen the quantity of dust produced during feeding, transportation and shooting; to improve pumping; to diminish the bubbling effect; to diminish the initial shrinkage and cracking, and thus increasing the long term strength and durability of shotcrete, by decreasing the water-cement ratio without affecting negatively the workability (often obtained by retarders, water reducers and superplasticizers); to improve cohesion of fresh shotcrete and build up thickness; to achieve a better cleft penetration and a more intimate contact with the former concrete and the reinforcements by eliminating the present air film on the concrete surface and on the reinforcements; to generate less static electricity during transportation and shooting; to get a better, easier and faster cleaning of the mixing, transporting and shooting equipment; to lessen the amount and size of the air voids in shotcrete, generated among others by a use of fibers; ensuring good projection of concrete in a wide range of temperatures.

The chemical inertness and the neutral pH of barite allow among others: achieving higher durability in humid aggressive environments ($H_2O$, sulphates, chlorides, alkali reaction with silica among others, etc.) of the cement paste and of the reinforcements; to soften the thermic shock caused by the cement chemical hydration causing the initial micro-cracking and shrinkage (this thermic shock softening, also due to the thermic accumulating capacity of barite); making its use compatible with cements, aggregates, admixtures and additives normally used in the shotcrete technology; the making of insulating barriers against gas or liquid chemical attacks; the shooting on a humid surface.

The fineness and the low hardness of barite allow among others: a better workability; a better cohesion of the shotcrete; better shotcrete build up thickness; better compactness; improved impermeability to air and water; higher density; less porosity by the reduction of air voids without affecting negatively the workability; a diminution of rebounds; a diminution of dust during the shooting; an increase of mechanical strength mainly the compressive one; better impermeability to gas; improved adherence by a more intimate contact with all surfaces including fissures and the parts behind reinforcements; a smoother thermic shock because of the density generated by the compaction resulting in less oxygen available for hydration; to improve the strength on freeze thaw cycles because of the higher insulation capacity against water, air, chlorides, etc.

The density of barite allows among others: better flow of the mix in the feeder; a bigger impact force of shotcrete on the receiving surfaces, improving adherence, compacting and auto-compacting, cohesion and maximal build up thickness, and consequently diminishing the quantity of setting accelerators needed for this cohesion; a diminution of dust during feeding (dust coming out from cement, aggregates, sand and pozzolanic-reacting mineral admixtures such as silica fume); increasing the speed of dust fixing, particularly in mines; less rebounds during shooting.

COMPARATIVE EXAMPLES

Engineer Toma experimented with a barite shotcrete mix, using a discontinue granulometric curve and a barite quality according to the following specifications. The results were conclusive and motivated the present demand.

Here are the weight proportions of different components as number of parts per 100 parts of cement according to the above experiment using a discontinue granulometric curve.

| | GROUT | COATING | MORTAR | CONCRETE | EMBANKMENT |
|---|---|---|---|---|---|
| CEMENT | 100 | 100 | 100 | 100 | 100 |
| BARITE (Grade-quality) | | | | | |
| $BaSO_4$ | 95%–97% | 95%–97% | 93%–95% | 90%–93% | 85%–90% |
| $SiO_2$ (max) | 3% | 2% | 3% | 3% | 7% |
| BARITE (Granulometry) | | | | | |
| 0.01–4 μm | 1–50 | 2 | 2 | 2 | 0.5 |
| 4–47 μm | 1 | 0.5 | 3 | 3 | 3 |
| 47–1000 μm | 2 | 2.5 | — | 3 | 2 |
| 1–3 mm | — | — | — | 4 | 2 |
| 3–7 mm | — | — | — | 10 | 15–20 |
| BARITE (Type of process): a = hydro gravitational, b = cyclone, c = flotation | | | | | |
| | a,b | a,b | a,b | a,b | a,b,c |
| $H_2O$ | 50–100 | 40 | 35–40 | 30–35 | 25–30 |
| SAND OF QUARTZ min 90% of $SiO_2$ | | | | | |
| 0.1–3 mm | — | — | 200 | 200 | 200 |
| GRAVEL | | | | | |
| 3–7 mm | — | — | 100 | 100 | 150 |
| 15–25 mm | — | — | — | 100 | 100 |
| 50–75 mm | — | — | — | — | 200 |

The used barite respected our following quality standards:

| | |
|---|---|
| $Ba SO_4$ | 97% (±) 5% |
| $SiO_2$ | 1% (±) 5% |
| $Fe_2O_3$ (max) | 0.15% |
| $BaCO_3$ (max) | 0.4% |
| Cu, Mn (max) | 0.003% |
| Pb, As | nil |
| Other Sulfides | 0.13% |
| $Al_2O_3$ (max) | 0.15% |
| $SrSO_4$ (max) | 0.15% |
| Soluble salts in water | 0.05% |
| Other alkali | 0.1% |
| $CaF_2$ | nil |
| Chlorides (max) | 0.03% |
| Humidity + Volatility (max) | 0.08% |
| pH | 7 |
| Mineral oil absorption | 11 |
| Density (min) | 4.30 |
| Hardness (max) | 3 |
| GRANULOMETRY ($BaSO_4$) | |
| Micronized powder | 0.01 μm |
| Fine powder | 4–47 μm |
| Normal powder | 47–1000 μm |
| GRANULOMETRY (Aggregates) | |
| Sand | 1–4 mm |
| Gravel | 7–25 mm |
| Coarse (embankments) | 25–75 mm |

Recently, the demanders realized tests by shooting concrete on wooden walls, on a concrete railing and on a damaged reinforced concrete discharge quay. The tests included projections to the ceiling, floor and walls. The thickness of the projected concrete varied between 3 and 15 cm.

Comparisons were done by the use of: a) standard mix, b) standard mix with 2% barite to 100% cement, c) standard mix with 5% barite to 100% cement, d) standard mix with 66 2/3% barite to 100% cement.

It was generally noted when using barite:
1) a small diminishing of dust during feeding and projection
2) that the shotcrete covered, spreaded and filled better; the "nozzleman" considered it as "muddier";
3) that the adhesion, the cohesion, and build-up thickness was similar or better;
4) that the finishing by trowel was easy, if not easier, but especially smoother; more, a shot of barite by hand on a finished and smoothed surface allowed one more smoother and regular finishing.

After having received coring samples few days after the projection, the following was noticed at the cores with barite as compared to those without barite:

1) a more regular spread of coarse aggregates, from the beginning of the coring up to the end, showing a diminution of rebounds during the beginning of projection and a better compactness;
2) less air voids, thus less porous;
3) a more intimate adherence to the receiving surface (wood, old concrete, metal);
4) a better colour uniformity showing a more homogenous mix;
5) a higher impermeability to water;
6) a comparable strength to pulling out, compression, torsion and shearing;
7) a better envelopment of the wire-netting (and maybe of the reinforcing bars) and of the coarse aggregates;
8) smoother side wall surface of cores.

Also, some tests were done using silica fume and barite, others using silica fume without barite: no noticeable association incompatibility was seen.

What is more, two types of shotcrete machines were used with no significant difference in the results.

The following non-limiting uses or advantages for barite shotcrete according to the invention are given as examples: in places where one can predict a little or not at all the evolution in the future; where one knows less or not at all about the evolution in the past; for the making of concrete pipes and ducts that should resist chemical-aggressive liquids; in the making and repairing of swimming pools and fish-ponds for aquaculture; in the making of domes, cupolas, vaults, and others that usually need trellis reinforcements; in agriculture, to isolate contaminating animal wastes, pesticides, fertilizers and to protect perishable goods against humidity and temperature changes as well as in horticulture for the making of mulch; in thermic storage (heatsink); external coatings for buildings facing corrosive wind action and salted air action along seashores; in works of repairing concrete infrastructures to make them more durable, more economic, and more flexible in the existing site conditions and safer for workers health; to get more predictable results; to ensure a longer life for the equipment, especially for machines and hoses; to make various repairs such as grout projection for foundations, mortar projections for brick walls, grout and coating projection on metro vaults; mine supporting works and mines restoration works; for making blocks, bricks, slabs and others by projection in moulds; and for other usable combinations of all above namely water ducts in hot and dry climate countries where water is very precious.

We claim:

1. A method of producing a shotcrete layer on a surface of a substrate, said method comprising:

a) providing a substrate with a surface consisting of beds of metal bearing and non-metal bearing minerals, coal, salt, ice deposits, construction materials, or degraded concrete;

b) forming in said substrate, at said surface, channels having a cross-section of inverted pyramidal shape or a swallowtail shape so as to anchor said layer in a manner to prevent circulation of water, injurious, aggressive, and explosive gases under pressure under said surface;

c) forming a water-hydratable-shotcrete mix, said shotcrete mix containing barite, said shotcrete mix does not contain calcium sulphate in free state nor any silica fume in free state; and d) pneumatically projecting said shotcrete mix at ambient temperature directly against said surface under conditions such that said shotcrete mix forms a layer, anchored by said channels, in the form of a microstructure which adheres to said surface without the use of forms or molds.

* * * * *